United States Patent
Müller et al.

(10) Patent No.: US 10,161,781 B2
(45) Date of Patent: Dec. 25, 2018

(54) DEVICE FOR DISPENSING A LIQUID

(71) Applicant: Endress+Hauser Conducta GmbH+Co. KG, Gerlingen (DE)

(72) Inventors: Frank Müller, Stuttgart (DE); Thomas Baumgartner, Stuttgart (DE); Ralf Bernhard, Stuttgart (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 167 days.

(21) Appl. No.: 15/279,198

(22) Filed: Sep. 28, 2016

(65) Prior Publication Data
US 2017/0089750 A1 Mar. 30, 2017

(30) Foreign Application Priority Data
Sep. 28, 2015 (DE) .................. 10 2015 116 392

(51) Int. Cl.
*G01F 23/292* (2006.01)

(52) U.S. Cl.
CPC .................. *G01F 23/2921* (2013.01)

(58) Field of Classification Search
CPC . G01F 23/292; G01F 23/2921; G01F 23/2927
See application file for complete search history.

(56) References Cited

U.S. PATENT DOCUMENTS

| | | | | | |
|---|---|---|---|---|---|
| 2,490,627 | A | * | 12/1949 | Hofberg | G01F 23/2921 250/577 |
| 3,071,961 | A | * | 1/1963 | Heigl | G01N 11/06 73/54.04 |
| 3,094,213 | A | * | 6/1963 | Wyman | B07C 5/3404 209/524 |
| 3,242,794 | A | * | 3/1966 | Crane | G01F 23/292 250/577 |
| 3,549,893 | A | * | 12/1970 | Gibbs | G01F 23/2921 250/577 |
| 3,609,379 | A | * | 9/1971 | Hildebrandt | A61M 5/1689 128/DIG. 13 |
| 3,908,441 | A | * | 9/1975 | Virloget | G01F 23/2921 250/577 |

(Continued)

FOREIGN PATENT DOCUMENTS

| | | | | |
|---|---|---|---|---|
| DE | 2437798 A1 | * | 2/1976 | ......... G01F 23/2921 |
| DE | 2855651 A1 | * | 6/1980 | ........... G01F 23/292 |

(Continued)

OTHER PUBLICATIONS

Search Report for German Patent Application No. 10 2015 116 392.6, German Patent Office, dated Mar. 7, 2016, 6 pp.

*Primary Examiner* — Harshad R Patel
*Assistant Examiner* — Punam P Roy
(74) *Attorney, Agent, or Firm* — Mark A. Logan; PatServe

(57) ABSTRACT

The present disclosure relates to a device for dispensing a liquid, including a vertically arranged, translucent pipe for guiding the liquid, wherein the pipe has an upper section and a lower section, wherein an inner diameter of the upper section is greater than an inner diameter of the lower section, at least two light barriers for detecting a rise in the liquid over two defined levels in the pipe, wherein a first light barrier detects a rise in the liquid in the upper section of the pipe, and wherein a second light barrier detects a rise in the liquid in the lower section of the pipe.

9 Claims, 3 Drawing Sheets

(56) References Cited

U.S. PATENT DOCUMENTS

| | | | | |
|---|---|---|---|---|
| 4,202,387 A * | 5/1980 | Upton | ............... | B65B 3/36 141/360 |
| 4,254,334 A * | 3/1981 | Baud | ............... | G01C 9/20 250/231.1 |
| 4,257,437 A * | 3/1981 | Pearson | ............... | G05D 7/0635 137/396 |
| 4,372,846 A * | 2/1983 | Yamagami | ............... | A61M 1/3441 210/321.65 |
| 4,517,830 A * | 5/1985 | Gunn | ............... | G01N 11/12 73/54.15 |
| 4,525,163 A * | 6/1985 | Slavik | ............... | A61M 5/1689 128/DIG. 12 |
| 4,569,227 A * | 2/1986 | Adolph | ............... | F02M 65/002 73/1.26 |
| 4,616,503 A * | 10/1986 | Plungis | ............... | G01N 11/06 73/54.08 |
| 4,665,391 A * | 5/1987 | Spani | ............... | G01F 23/2921 250/577 |
| 5,776,317 A * | 7/1998 | Spring | ............... | B01D 11/0219 202/168 |
| 6,057,772 A * | 5/2000 | Burkett | ............... | A47J 37/1266 236/20 R |
| 6,664,558 B1 * | 12/2003 | Barbier | ............... | G01F 23/2921 250/216 |
| 6,794,184 B1 * | 9/2004 | Mohr | ............... | C12M 23/44 435/294.1 |
| 9,128,051 B2 * | 9/2015 | Bui | ............... | G01N 21/59 |
| 9,381,523 B2 * | 7/2016 | Marsh | ............... | B04B 11/04 |
| 2001/0025527 A1 * | 10/2001 | Handschuck | ............... | G01F 23/20 73/149 |
| 2005/0238504 A1 * | 10/2005 | Yajima | ............... | F04B 43/0081 417/394 |
| 2010/0273273 A1 * | 10/2010 | Cross | ............... | A01J 5/0133 436/174 |
| 2012/0315381 A1 * | 12/2012 | Mergner | ............... | F01N 3/2828 427/8 |
| 2014/0233042 A1 * | 8/2014 | Klinec | ............... | G01N 15/042 356/614 |
| 2015/0168373 A1 * | 6/2015 | Volker | ............... | G01N 21/27 422/68.1 |
| 2016/0178425 A1 * | 6/2016 | Bernhard | ............... | G01N 31/00 250/577 |
| 2017/0319809 A1 * | 11/2017 | Biba | ............... | A61M 16/1005 |

FOREIGN PATENT DOCUMENTS

| | | | | |
|---|---|---|---|---|
| DE | 3605403 A1 * | 8/1987 | ............... | G01F 23/02 |
| DE | 4114673 C1 | 11/1992 | | |
| DE | 29913472 U1 * | 10/1999 | ............... | F01M 11/12 |
| DE | 102013114138 A1 | 6/2015 | | |
| EP | 0619476 A1 * | 10/1994 | ............... | G01F 23/292 |
| GB | 2226879 A * | 7/1990 | ............... | A61M 5/14 |
| JP | 4417483 B2 * | 2/2010 | | |
| WO | WO 2005064328 A1 * | 7/2005 | ............... | G01N 21/251 |
| WO | WO 2010141458 A2 * | 12/2010 | ............... | A61B 5/205 |

* cited by examiner

DEVICE FOR DISPENSING A LIQUID

CROSS-REFERENCE TO RELATED APPLICATIONS

The present application is related to and claims the priority benefit of German Patent Application No. 10 2015 116 392.6, filed on Sep. 28, 2015, the entire contents of which are incorporated herein by reference.

TECHNICAL FIELD

The present disclosure relates to liquid metering devices.

BACKGROUND

A conventional way of dispensing volumes of liquids is to fill a translucent pipe up to a certain fill level. Upon reaching the desired fill level, the liquid surface is detected by means of a light barrier. Here, one takes advantage of the fact that the refractive index of the liquid to be dispensed is very different from the refractive index of air. Therefore, a filled pipe will refract the light of the light barrier differently than an unfilled pipe. A light receiver registers this difference. If the pipe is filled up to the light barrier, the filling is stopped, and the contents of the pipe can be emptied as measured volume and used further. If several different volumes are to be dispensed, then several light barriers will need to be used. A disadvantage here is that the ratio of the smallest possible to the largest possible dispensing volume is dependent upon the spatial requirements of a light barrier and the length of the pipe.

DE 10 2013 114 138 A1 contains an analytical device for determining a parameter of a liquid sample, comprising a container system for storing samples, reagents, and waste products in containers and a conveyor and dispensing system for metering and conveying the sample and reagents from the containers into a metering vessel and for disposal of waste products from the metering vessel into a waste container. The conveyor and dispensing system are designed as a metering vessel for removal of a predetermined volume of a liquid as a liquid sample from a sample-taking location.

BRIEF SUMMARY

The object of the present disclosure is to disclose a dispensing apparatus with which very different volumes can be dispensed.

The aim is achieved by the object of the present disclosure. The subject matter of the present disclosure is a device for dispensing a liquid, including a vertically arranged, translucent pipe for guiding the liquid, wherein the pipe has an upper section and a lower section, wherein an inner diameter of the upper section is greater than an inner diameter of the lower section, at least two light barriers for detecting a rise in the liquid over two defined levels in the pipe, wherein a first light barrier detects a rise in the liquid in the upper section of the pipe, and wherein a second light barrier detects a rise in the liquid in the lower section of the pipe.

According to an embodiment, at least two light barriers are arranged at the upper section of the pipe, wherein one of the at least two light barriers is arranged as close as possible to the lower section of the pipe.

According to an embodiment, at least a first light barrier is arranged at the upper section, and a second light barrier is arranged at the lower section of the pipe.

According to an embodiment, the pipe is formed in one piece, such that the inner diameter of the upper section transitions continuously into the inner diameter of the lower section.

According to an advantageous embodiment, the pipe includes a one-piece pipe section with a constant inner diameter and an inner pipe, wherein the inner pipe is arranged in the pipe section in such a way that the inner pipe defines the lower section of the pipe.

According to a further embodiment, at least one of the at least two light barriers has at least two receivers on a plane parallel to a surface of the liquid, so that foam formation on the liquid does not influence the dispensing of the liquid.

The object of the present disclosure is also achieved by an analyzer for determining the measurand of a liquid sample, including a device according to the present disclosure for dispensing a liquid, further including: a measuring cell, at least one liquid tank containing a treatment fluid, especially one or more reagents for treating the liquid sample, a process engineering device comprising a conveyor and dispensing apparatus for conveying and dispensing the liquid sample from the sample collection unit and the treatment fluid from the liquid tank to the measuring cell, and a measuring sensor, especially a photometric one, designed to provide at least one measuring signal correlating to the measurand of the liquid sample treated with the treatment fluid and contained in the measuring cell.

The dispensing apparatus of the analyzer corresponds to the device for dispensing a liquid of the first subject matter of the present disclosure.

BRIEF DESCRIPTION OF THE DRAWINGS

The present disclosure is explained in more detail, based upon the following drawings. Illustrated are.

DETAILED DESCRIPTION

Figure 1:
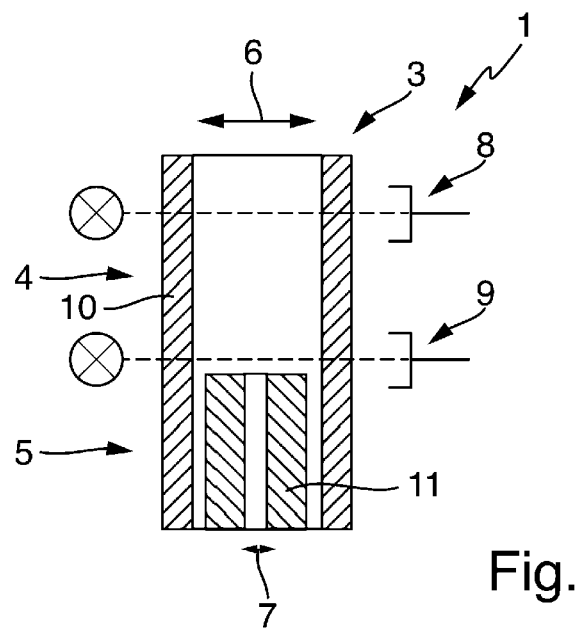
FIG. 1 shows a cross-sectional view of a device for dispensing a liquid, according to an embodiment of the present disclosure.

FIG. 1 shows a cross-section of a device 1 for dosing a liquid with a pipe 3, including a pipe section 10 and an inner pipe 11. The pipe section 10 has a constant inner diameter throughout. The inner pipe 11 is arranged inside the pipe section 10 in such a way that the inner pipe 11 defines a lower section 5, and the rest of the inner pipe 11 defines an upper section 4 of the pipe 3.

As shown in FIG. 1, an inner diameter 6 of the upper section 4 is greater than an inner diameter 7 of the lower section 5. Further, the device 1 comprises two light barriers 8, 9 for detecting a rise in the liquid 2 over two defined levels in the pipe 3, wherein a first light barrier 8 detects a rise in the liquid 2 in the upper section 4 of the pipe 3, and wherein a second light barrier 9 detects a rise in the liquid in the lower section 5 of the pipe 3.

The two light barriers 8, 9 are arranged at the upper section 4 of the pipe 3, wherein one of the two light barriers 8, 9 is arranged as close as practicable to the lower section 5 of the pipe 3. This results in the rising liquid being detected as soon as the liquid leaves the lower section.

In this way, the volume in the lower section 5 of the pipe 3 can be made very small. The advantage of this solution is the usability of a simple, cost-effective pipe 3 and the use of the same kind of light barriers 8, 9.

Figure 2:
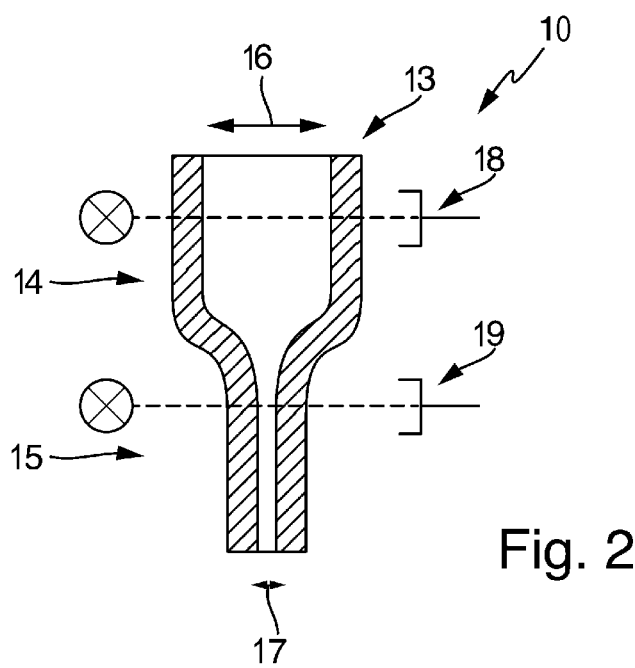
FIG. 2 shows a cross-sectional view of a device for dispensing a liquid, according to a further embodiment of the present disclosure.

FIG. 2 shows a cross-section of a device 10 for dispensing a liquid according to FIG. 1 with a one-piece pipe 13, wherein a first light barrier 18 is arranged at the upper section 14, and a second light barrier 19 is arranged at a lower section 15 of the pipe 13. The inner diameter 16 of an upper section 14 transitions in a gradient to the inner diameter 17 of the lower section 15.

The advantage of this solution is that only one component namely, the one-piece pipe 13 is used, and different pipe pieces which exactly fit each other (inner diameter of the outer pipe =outer diameter of the inner pipe) need not be fabricated and sealed against each other.

Figure 3:
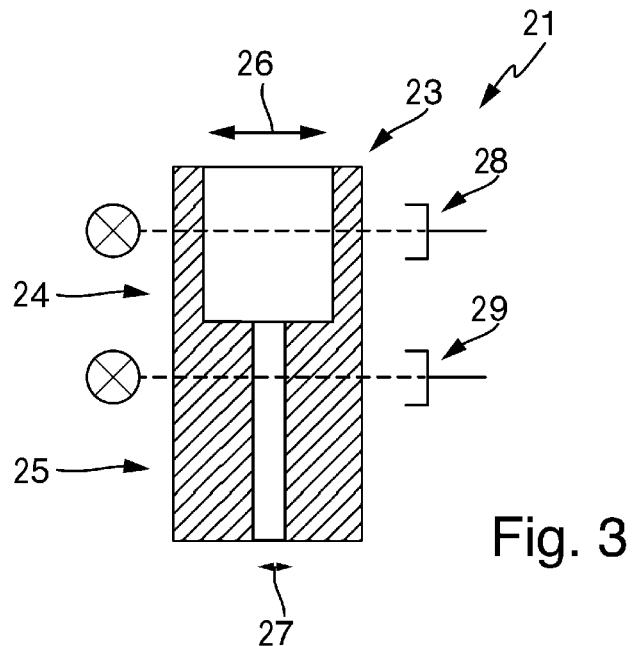
FIG. 3 shows a cross-sectional section of a device for dispensing a liquid, according to a further embodiment of the present disclosure.

FIG. 3 shows a longitudinal section of a device 21 for dispensing a liquid according to FIG. 1 with a pipe 23, comprising a first and a second pipe piece. The first pipe piece has a larger inner diameter and defines the upper section 24, and the second pipe piece has a smaller inner diameter and defines the lower section 25. The first and the second pipe pieces are welded together. The advantage of this solution is that both light barriers 28, 29 can be executed as identical, because the lower as well as the upper section 24, 25 have the same outer diameter.

Figure 4:
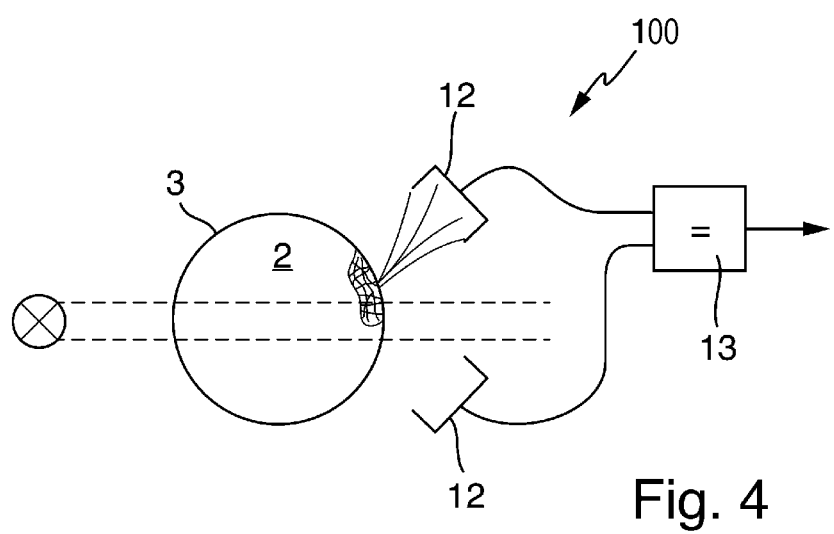
FIG. 4 shows a cross-section of a device according to one of FIGS. 1 through 3, according to a further embodiment of the present disclosure.
Figure 5:
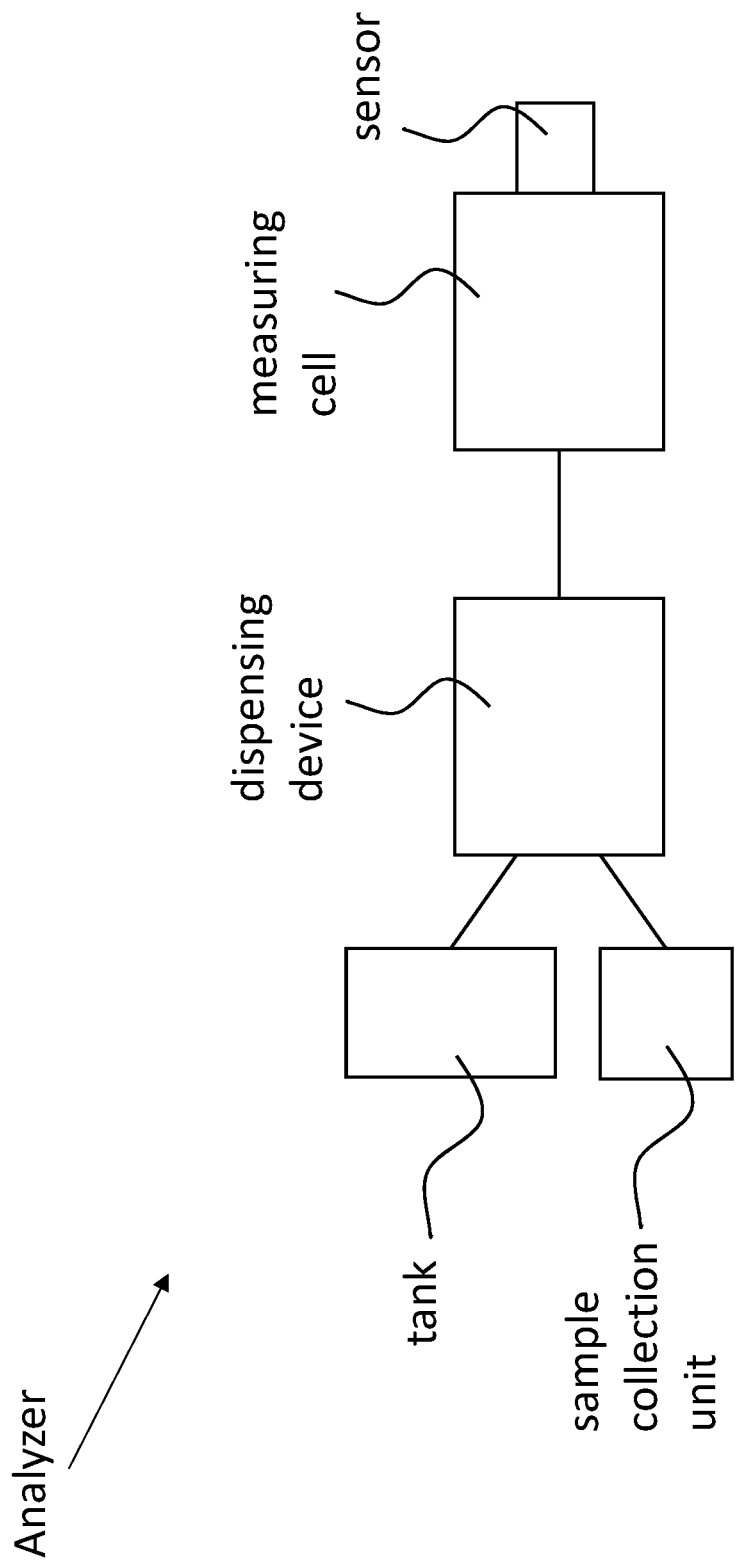
FIG. 5 shows a schematic of an analyzer according to an embodiment of the present disclosure.

FIG. 4 shows a cross-section of a device 100 according to one of FIGS. 1 through 3, wherein the upper light barrier has two receivers 12. Both receivers 12 are arranged in a plane parallel to a surface of the liquid 2. If foam forms on the surface of the liquid 2, it is likely that the foam will cover only one of the two receivers, and not both. A comparator 13 signals that, when the liquid 2 rises, first one receiver and then both receivers 12 have indicated "covered," and the comparator signals the status "covered" only if both receivers indicate the status "covered." This way, foam formation on the liquid 2 will not influence the dispensing of the liquid 2.

An analyzer for determining a measurand of a liquid sample comprises a dispensing apparatus for dispensing the liquid sample from the sample collection unit and for dispensing treatment fluids, in particular, reagents. Since the liquid sample needs to be dispensed differently for different purposes, a device according to the present disclosure corresponding to FIGS. 1 through 3 is used for dispensing the sample liquid.

The invention claimed is:

1. An analyzer for determining a measurand of a liquid sample, comprising:
   a measuring cell;
   at least one liquid tank structured to contain a treatment liquid;
   a sample collection unit
   a dispensing device comprising:
      a vertically oriented, translucent pipe having a first section and a second section, wherein an inner diameter of the first section is greater than an inner diameter of the second section,
      a first light barrier disposed to detect a liquid level at a first predetermined level in the first section, and
      a second light barrier disposed to detect a liquid level at a second predetermined level in the second section,
      wherein the dispensing device is embodied to convey and dispense the liquid sample from the sample collection unit to the measuring cell and to convey and dispense the treatment fluid from the liquid tank to the measuring cell; and
   a measuring sensor structured to provide at least one measuring signal correlating to the measurand of the liquid sample treated with the treatment fluid and contained in the measuring cell.

2. The analyzer according the claim 1, wherein the measuring sensor is a photometric sensor.

3. The analyzer according to claim 1, wherein the treatment fluid includes one or more reagents.

4. The analyzer according to claim 1, wherein the first light barrier and the second light barrier are disposed along the first section, and the second light barrier is disposed as close as practicable to the second section.

5. The analyzer according to claim 1, wherein the first light barrier is disposed along the first section, and the second light barrier is disposed along the second section.

6. The analyzer according to claim 1, wherein the pipe is one piece and the transition from the inner diameter of the first section to the inner diameter of the second section is a gradient.

7. The analyzer according to claim 1, wherein the second section is at least partially disposed within the first section.

8. The analyzer according to claim 1, wherein at least one light barrier includes at least two receivers disposed on a plane parallel to one surface of the liquid.

9. The analyzer according to claim 1, wherein the first section is an upper section of the translucent pipe and the second section is a lower section of the translucent pipe.

\* \* \* \* \*